United States Patent [19]

Hayashi

[11] Patent Number: 4,901,264

[45] Date of Patent: Feb. 13, 1990

[54] PSEUDO RANDOM PATTERN GENERATING DEVICE

[75] Inventor: Mishio Hayashi, Saitama, Japan

[73] Assignee: Advantest Corporation, Tokyo, Japan

[21] Appl. No.: 221,520

[22] Filed: Jul. 20, 1988

[30] Foreign Application Priority Data

Jul. 31, 1987 [JP] Japan .............................. 62-192157
Jul. 31, 1987 [JP] Japan .............................. 62-192158

[51] Int. Cl.$^4$ .......................... G06F 1/02; G06F 3/00
[52] U.S. Cl. ................................................ 364/717
[58] Field of Search ........................... 364/717, 717.5

[56] References Cited

U.S. PATENT DOCUMENTS

| | | | |
|---|---|---|---|
| 4,667,301 | 5/1987 | Chiu et al. .......................... | 364/717 |
| 4,748,576 | 5/1988 | Beker et al. ........................ | 364/717 |
| 4,774,681 | 9/1988 | Frisch ................................ | 364/717 |

Primary Examiner—David L. Clark
Assistant Examiner—Long T. Nguyen
Attorney, Agent, or Firm—Staas & Halsey

[57] ABSTRACT

A pseudo random pattern generating device generates a pseudo random pattern, which recurs on a cycle of $(2^n-1)$ bits. The device sequentially converts from parallel to serial form $2^m$-bit patterns read out of a pattern memory having stored at each address a subpattern composed of one of $2^{n-m}$ split patterns. A basic pseudo random pattern is split at intervals of $2^m$ bits and a continuation pattern of a predetermined number of bits subsequent to each split pattern in the recurring random pattern. A pattern of $2^m$ bits to be taken out of each subpattern which is read out of the pattern memory is shifted one bit position upon each readout of $2^{n-m}$ subpatterns.

10 Claims, 5 Drawing Sheets

FIG. 4

PSEUDO RANDOM PATTERN GENERATING DEVICE

BACKGROUND OF THE INVENTION

The present invention relates to a pseudo random pattern generating device which generates, at high speed, a pseudo random pattern which repeats the same pattern on a cycle of $2^n-1$ bits.

In the field of digital communications there is a demand for a pseudo random pattern generating device which operates at a speed as high as 3 to 10 GHz. From the technical viewpoint, however, it is extremely difficult to achieve such a high-speed operation with conventional pseudo random pattern generating devices of the type employing a register system.

FIG. 1 shows an example of the arrangement of a conventional pseudo random pattern generating device using a memory system which can be implemented through utilization of relatively simple high speed technology alone.

The prior art example is shown to generate a pseudo random pattern continuously repeating a basic random pattern which is $2^4-1=15$ bits long, for instance, "100110101111000". This example will be described in connection with the case where the patterns to be generated are stored in a pattern memory 11 in which one word is composed of four bits.

The 15-bit long basic random pattern "100110101111000" is split into 4-bit patterns, beginning with the leftmost four bits, and these split patterns are stored in the pattern memory 11. At address 0 is stored a 4-bit split pattern "1001", at address 1 a 4-bit split pattern "1010", at address 2 a 4-bit split pattern "1111", and at address 3 a 4-bit split pattern "0001" which is a combination of the rightmost three bits "000" of the 15-bit basic random pattern and the leftmost bit "1" of the same basic random pattern "100110101111000" of second occurrence. At addresses 4 to 6 are stored subsequent split patterns "0011", "0101" and "1110", respectively, and at address 7 is stored a split pattern "0010" which is composed of the rightmost two bits "00" of the basic random pattern of second occurrence and the leftmost two bits "10" of the basic random pattern of third occurrence. At addresses 8 to 13 are stored 4-bit split patterns into which the 15-bit basic random pattern is split in a similar manner. At address 14 is stored a 4-bit split pattern "1000" composed of the rightmost four bits of the basic random pattern of fourth occurrence.

Upon application of a clock C to an address counter 12, its count value which is incremented by one upon each counting of the clock C is provided to an address decoder 14 of the pattern memory 11, and a split pattern stored at the decoded address of the pattern memory 11 is read out therefrom and provided, as 4-bit parallel data, to a parallel-serial converter 15. The parallel-serial converter 15 converts the 4-bit split pattern into serial data and outputs it as a pseudo random pattern on a bitwise basis.

As the count value of the address counter 12 is incremented from 0 to 3 by the clock C, the split patterns "1001", "1010", "1111" and "0001" are read out of the pattern memory 11 in that order. By concatenating these four split patterns and outputting them in serial form, the basic random pattern "100110101111000" of first occurrence and the leftmost bit "1" of the basic random pattern of the next occurrence are output. Following this, the split patterns "0011", "0101", ... stored at addresses 4 to 14 are read out in a sequential order, thus creating a pseudo random pattern which provides the basic random pattern "100110101111000" in a repeating cyclic order.

On the other hand, a numerical value "14" is set, as a stop code indicating the last address of the pattern memory 11, in a register 16. The set value "14" and the count value of the address counter 12 are provided to a coincidence detector 17. When coincidence is detected between the count value of the address counter 12 and the set value "14", the coincidence detector 17 yields a coincidence detection signal, by which an AND gate 18 is enabled. The clock C, which occurs after the detection of coincidence, is provided via the AND gate 18 and an OR gate 19 to the address counter 12, clearing it to zero. Consequently, the readout of the split pattern "1000" from address 14 is followed by the split pattern readout operation which starts again at address 0.

By reading out the four 15-bit long basic random patterns from addresses 0 to 14 in a repeating cyclic order as described above, it is possible to produce a pseudo random pattern which repeats the same random pattern at intervals of 15 bits.

With the above-described prior art example, however, no continued repetition of the basic random pattern can be obtained unless an integral number of the basic random patterns are stored in the pattern memory 11 so that the last bit in the last one of that number of basic random patterns locates at the rightmost bit position of the 4-bit word read out from the last address. For example, as shown in FIG. 1, the last bits (indicated by black triangles) of the basic random patterns stored in addresses 3, 7 and 11 do not occupy the rightmost bit positions of the split patterns stored at these addresses, and the last bit of a basic random pattern assumes the rightmost bit position of a split pattern for the first time at address 14 from which the rightmost four bits of the fourth basic random pattern are read out.

For example, in the case of successively generating a $(2^{23}-1)$ bits long basic random pattern by reading it out, for instance, every 4-bit split pattern, it is necessary that at least four pseudo random patterns, which is an integral multiple of 4, be stored in a memory, and the required memory capacity therefor is $(2^{23}-1) \times 4 = 8388607 \times 4$ bits, which is the least common multiple of $(2^{23}-1)$ and 4; in this case, four standard 8-megabit memories are needed.

Such a large-capacity memory is usually formed by a MOS memory, and hence requires a read cycle time which is so long that the high-speed generation of the pseudo random pattern calls for increasing of the number of bits of each split pattern, that is, the number of bits of one word which is stored at each address. For example, where the number of bits of each split pattern is 256 bits, a memory of a capacity of 8 megabits $\times 256$ bits $=2$ gigabits is needed; in practice, however, it is difficult to implement such a large capacity.

SUMMARY OF THE INVENTION

It is therefore an object of the present invention to provide a pseudo random pattern generating device which permits the generation of a random pattern in a repeating cyclic order through use of a relatively small-capacity memory.

According to the present invention, a pseudo random pattern which recurs on a cycle of $(2^n-1)$ (where n is an integer equal to or greater than 3) bits is split, starting at the beginning of the pseudo random pattern, into $2^n/2^m=2^{n-m}$ (where m is a positive integer smaller than n) patterns each of $2^m$ bits in length, and each split pattern is combined with a continuation pattern of a predetermined number ($2^m$) of bits subsequent thereto in the above-mentioned recurring random pattern, forming a subpattern of at least $2^{m+1}-1$ bits in length. The $2^{n-m}$ subpatterns thus obtained are stored in a pattern memory at $2^{n-m}$ addresses and read out therefrom in a repeating cyclic order.

The pseudo random pattern generating device of the present invention is provided with a $2^{n-m}$-counter as an address counter which counts clocks and provides addresses to the pattern memory for readout thereof, shift means whereby upon each completion of the readout of all the $2^{n-m}$ subpatterns from the pattern memory the $2^m$-bit continuation pattern subsequent to each subpattern read out of the pattern memory is shifted one bit position and is output, a latch for latching the $2^m$-bit continuation pattern output from the shift means, and a parallel-serial converter for converting the latched pattern into a serial pattern for output therefrom.

BRIEF DESCRIPTION OF THE DRAWINGS

Figure 4:
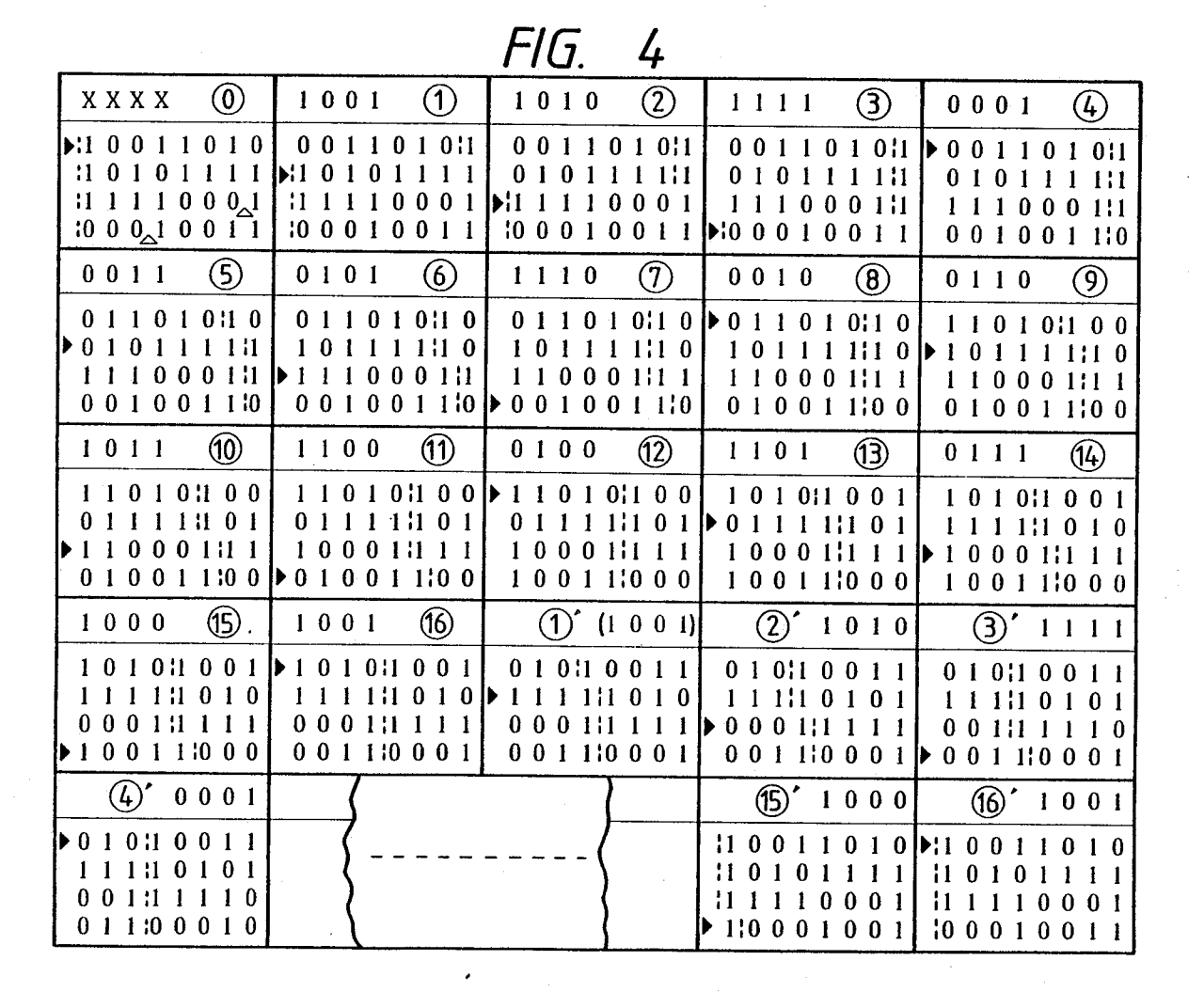

FIG. 4 is a table showing how subpatterns stored in a pattern memory are sequentially rotated left.

DESCRIPTION OF THE PREFERRED EMBODIMENTS

Figure 1:
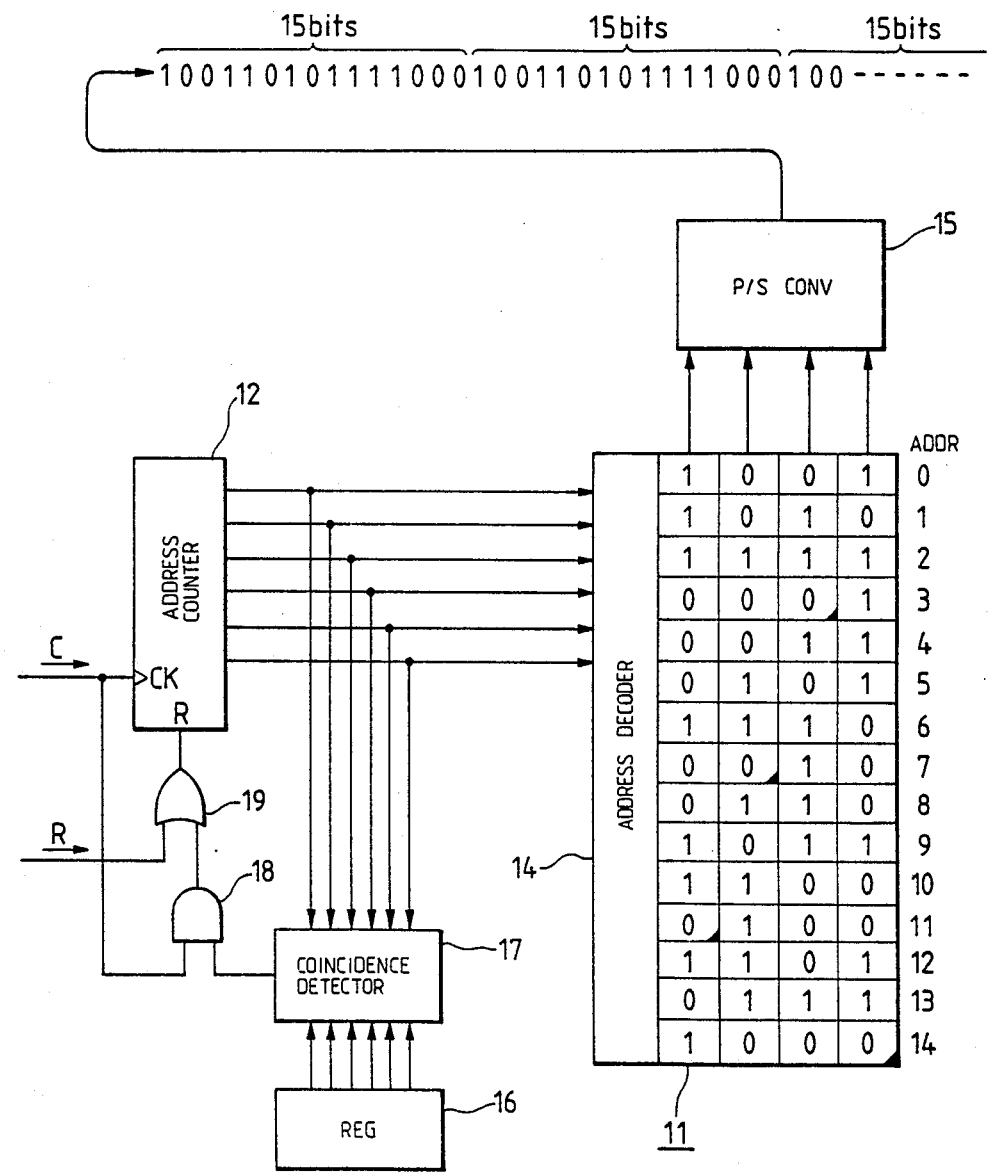
FIG. 1 is a diagram showing an example of a conventional pseudo random pattern generating device.
Figure 2:
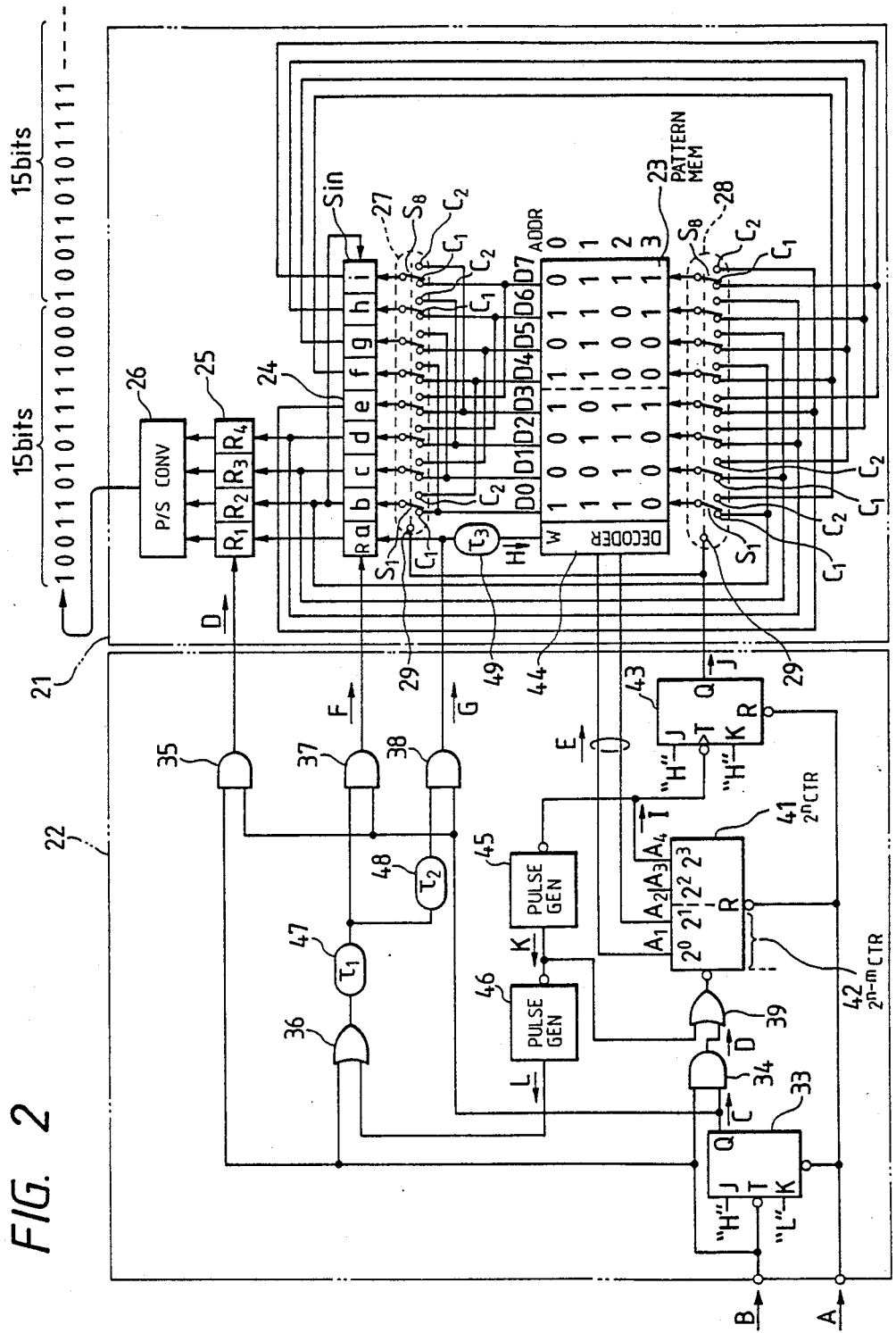
FIG. 2 is a circuit diagram of the pseudo random pattern generating device according to the present invention.

FIG. 2 is a circuit diagram illustrating an embodiment of the pseudo random pattern generating device of the present invention. According to the present invention, a basic random pattern which recurs on a cycle of $2^n-1$ bits is split every $2^m$ bits into $2^{n-m}$ split patterns. Each split pattern is combined with a continuation pattern composed of $2^m$ bits subsequent thereto in the recurring basic random pattern, obtaining $2^{n-m}$ subpatterns each of $2^{m+1}$ bits in length. The $2^{n-m}$ subpatterns are prestored in a pattern memory. To facilitate a better understanding of the present invention, this embodiment will be described with regard to the case where n=4 and m=2 so that a pseudo random pattern is generated in which a $2^4-1$, that is, 15 bits long basic random pattern "100110101111000" is repeated in a cyclic order, as in the prior art example shown in FIG. 1.

The pseudo random generating device of the present invention comprises a pattern generator 21 and its controller 22. A pattern memory 23 provided in the pattern generator 21 is a 4-word random access memory (RAM) in which one word is composed of $2^{m+1}=8$ bits.

The pattern generator 21 comprises the (8 bits ×4 words) pattern memory 23 for storing subpatterns, a 9-stage shift register 24 which is supplied with an 8-bit output from the pattern memory 23, a latch 25 which is made up of four registers $R_1$ to $R_4$ and supplied with a portion of a parallel output from the shift register 24, a parallel-serial converter 26 which is supplied with the output from the latch 25, and two selectors 27 and 28, each composed of eight ganged switches, for interconnecting the input and output terminals of the pattern memory 23 and the shift register 24.

Outputs D0 to D7 of first to eighth bits of the pattern memory 23 are connected to eight switches $S_1$ to $S_8$ of the readout selector 27 at one input contacts $C_1$, the outputs of D4 to D7 of the fifth to eighth bits of the pattern memory 23 are connected to the other input contacts $C_2$ of the left-hand switches $S_1$ to $S_4$ of the selector 27, and the outputs D0 to D3 of the first to fourth bits of the pattern memory 23 are connected to the other input contacts $C_2$ of the right-hand switches $S_5$ to $S_8$ of the selector 27. The readout switches $S_1$ to $S_8$ are arranged so that they supply, second to ninth shift stages b to i of the shift register 24 with signals applied to the input contacts $C_1$ or $C_2$, under control of a select signal which is provided to a control terminal 29.

The outputs of the first to fourth shift stages a to d of the shift register 24 are provided to the first to fourth registers $R_1$ to $R_4$ of the latch 25, the outputs of which are applied to the parallel-serial converter 26. The parallel-serial converter 26 converts the applied data into serial data and outputs it as a pseudo random pattern on a bitwise basis.

Further, the outputs of the second to ninth shift stages b to i of the shift register 24 are applied to first to eighth switches $S_1$ to $S_8$ of the write selector 28 at one input contacts $C_1$ thereof. At the same time, the outputs of the sixth to ninth shift stages f to i of the shift register 24 are applied to the other input contacts $C_2$ of the first to fourth switches $S_1$ to $S_4$ of the write selector 28 and the outputs of the second to fifth shift stages b to e are applied to the other input contacts $C_2$ of the fifth to eighth switches $S_5$ to $S_8$ of the selector 28, respectively. These switches $S_1$ to $S_8$ are arranged so that the signals applied to the input contacts $C_1$ or $C_2$ are provided as data D0 to D7 for write into the first to eighth bits of the pattern memory 23, under control of a select signal which is applied to a control terminal 29.

Moreover, the output of the second shift stage b of the shift register 24 is provided to a serial data input terminal Sin of the ninth shift stage i.

A start signal A and a clock B are applied to the controller 22, wherein various control signals are created for controlling the pattern generator 21.

The clock B is provided to a trigger terminal T of a J-K flip-flop 33, AND gates 34 and 35 and an OR gate 36. The flip-flop 33 is supplied at its J and K terminals with high- and low-level signals, respectively, and provides a high-level signal at its Q output terminal in response to the fall of the signal applied to the trigger terminal T. The output signal C of the flip-flop 33, is applied as a gate control signal to one input terminal of each of AND gates 34, 35, 37 and 38. When the control signal is a high-level signal and hence is an enable signal, these AND gates 34, 35, 37 and 38 are enabled, from which control signals applied to the other input terminals are output from their output terminals. Accordingly, when the AND gate 34 is enabled, the clock B supplied to the other input terminal thereof is provided therethrough to a counter 41 via an OR gate 39.

The counter 41 is a $2^n$ counter. The maximum count value of an address counter 42 is selected equal to the number of subpatterns into which the basic random pattern is split every $2^m$ bits.

In this embodiment, the low-order two digits of the $2^n$ counter 41, which is a $2^4$ counter in this case, are shared with the address counter 42, and count outputs A1 and A2 of the low-order two digits are provided as address signals to an address decoder 44 in the pattern memory 23. The output of the most significant digit A4 is applied to a pulse generator 45, whose output is provided to another pulse generator 46 and via the OR gate 39 to the counter 41. The output pulse of the pulse generator 46 and the clock B are both applied via the OR gate 36 to a delay circuit 47, wherein they are delayed by $\tau_1$, and the delayed output is provided as a readout pulse F to the shift register 24 via the AND gate 37. This delayed output is provided to another delay circuit 48, wherein it is further delayed by $\tau_2$, and this delayed output is applied as a left shift pulse G to the shift register 24 via the AND gate 38. At the same time, the left shift pulse B is supplied as a write pulse H to the pattern memory 23 via a delay circuit 49.

The output A4 of the $2^4$ counter 41 is applied as a trigger signal I to a flip-flop 43. The flip-flop 43 is being supplied at its J and K terminals with high-level signals and inverts the level of an output signal at its Q output terminal upon each application of the trigger signal. The output of the flip-flop 43 is provided to the control terminals of the selectors 27 and 28 as the afore-mentioned select signal J for selecting their contacts $C_1$ or $C_2$.

In this embodiment the 15-bit basic random pattern is split at intervals of $2^2=4$ bits into $2^{4-2}=4$ patterns, each of which is combined with the subsequent four bits into a subpattern composed of a total of $2^{2+1}=8$ bits. The four subpatterns are stored in the pattern memory 23 at addresses 0 to 3 in right order, as indicated by "0s" and "1s" in FIG. 2. At address 0 there is stored an 8-bit subpattern "10011010" composed of the first eight bits of the basic random pattern "100110101111000", at address 1 an 8-bit subpattern "10101111" composed of the 5th to 12th bits of the basic random pattern, at address 2 an 8-bit subpattern "11110001" composed of the 9th to 15th bits of the basic random pattern and the first bit of the next basic random pattern, and at address 3 an 8-bit subpattern "00010011" composed of the 13th to 15th bits of the first basic random pattern and the first to 5th bits of the next basic random pattern.

FIGS. 3A to 3L show a series of waveforms occurring at respective parts of the controller 22, for explaining the operation of reading out the subpatterns stored in the pattern memory 23 and generating a pseudo random pattern which repeats the same pattern periodically at intervals of 15 bits. The waveform A indicates the start signal A and the waveform B the clock B. FIG. 4 is a transition diagram showing how the stored contents of the subpatterns in the pattern memory 23 change in the course of control for the generation of the pseudo random pattern. Fields ①, ②,..., ⑯, ①', 2 ',... in this transition diagram are shown corresponding to the addresses E which the counter 42 yields in succession while counting sample clocks $D_1$, $D_2$, ..., $D_{16}$, $D'_1$, $D'_2$, ... in the waveform D shown in FIG. 3. The fields ①, ②, ... in FIG. 4 each show the currently stored contents of subpatterns in the pattern memory 23 and a 4-bit pattern readout in the immediately preceding field and currently output from the latch 25. The field ⓪ shows the initial state of the pattern memory 23, that is, the stored contents of subpatterns in the pattern memory 23 prior to the start of operation; namely, the subpatterns "10011010", "10101111", "11110001" and "0010011" are stored at addresses 0, 1, 2 and 3, respectively. The vertical broken lines shown before the respective subpatterns indicate the positions of splitting the basic random pattern into 4-bit lengths. The pattern splitting positions are cyclically shifted left as control proceeds. For example, in the field ① showing the stored contents after one-clock control it is shown that the subpattern at address 0 is cyclically shifted left one bit position, with the splitting position shifted between the seventh and eighth bits. Accordingly, the subpatterns at the subsequent addresses are also sequentially rotated left as shown in each field. The white triangles shown at addresses 2 and 3 in the field ⓪ indicate the ends of the 15-bit basic random pattern. The black triangle shown in each field indicates the address being currently specified. The 4-bit pattern shown at the high-order position in each field indicate a 4-bit pattern being currently latched in the latch 25.

Figure 3:
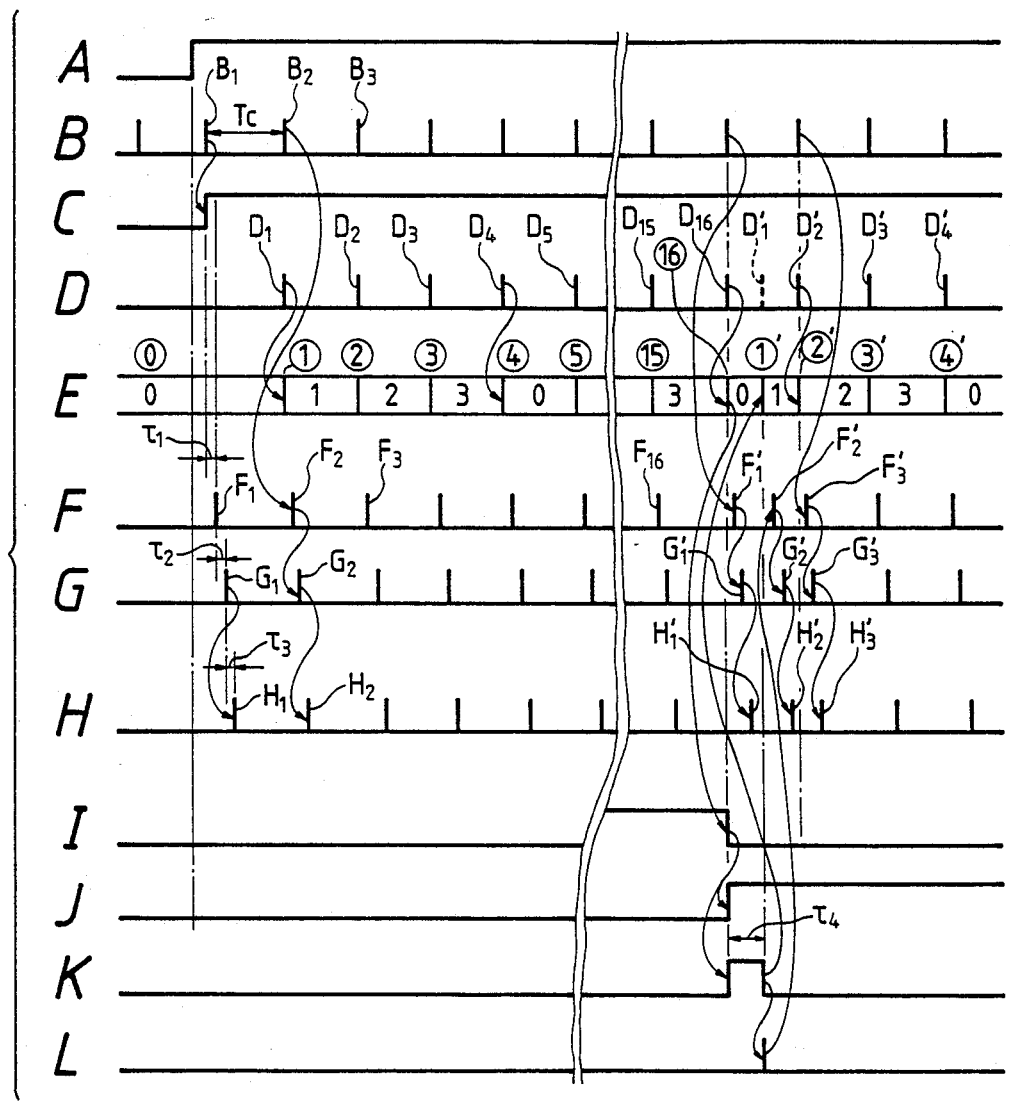
FIG. 3 is a waveform diagram, for explaining the operation of the device shown in FIG. 2.

When the start signal A rises to the high level as shown in FIG. 3, the flip-flops 33 and 43 and the counter 41 are released from the reset state and put into the ready state. The count values of the address counter 42 and the quaternary counter following it (i.e. the high-order two digits of the $2^4$ counter) are both zero. The signal C at the Q output terminal of the flip-flop 33 goes high in synchronism with the clock $B_1$ subsequent to the rise of the start signal A, and the high-level signal C is applied to the AND gates 34, 35, 37 and 38, enabling them.

In this embodiment, the counter 41 is a hexadecimal counter and the count output of its low-order two digits is utilized as the quaternary address counter 42. The clock $B_1$ cannot pass through the AND gate 34 because it has not been enabled yet at that instant, and the subsequent clocks $B_2$, $B_3$, ... pass through the AND gate 34 and are provided as sample clocks $D_1$, $D_2$, ... to the quaternary address counter 42. The sample clock C is counted by the address counter 42, whose quaternary count value is output as the address signal E (FIG. 3). The count output E is applied to the address decoder 44 of the pattern memory 23, by the decoded output of which readout addresses of the pattern memory 23 are specified cyclically in the order of 0, 1, 2 and 3, as shown in row E of FIG. 3.

The shift register 24 is formed by nine shift stages a to i and the output D0 to D7 of eight bits from the pattern memory 23 is provided via the selector 27 to the eight shift stages b to i. The clock $B_1$ supplied to the flip-flop 33 is delayed $\tau_1$ by the delay circuit 47, and consequently it is allowed to pass through the AND gate 37 already enabled at that time and is then applied as a read pulse $F_1$ to the shift register 24. The shift register 24 responds to the read pulse $F_1$ to read into the second to ninth shift stages b to i the 8-bit subpattern stored in the pattern memory 23 at address 0. The first shift stage a is not supplied with data and hence is undefined "X"; for example, when having read therein the subpattern stored at address 0, the shift register 24 shows a pattern "X10011010".

The clock $B_1$ delayed by the delay circuit 37 is further delayed $\tau_2$ by the delay circuit 48 and is then provided as a left shift pulse G ($G_1$ in row G of FIG. 3) to the shift register 24 via the AND gate 38. By the left shift pulse $G_1$ the data "10011010" in the second to ninth shift stages b to i is shifted one stage to the first to eighth shift stages a to h, respectively, and the data in the second shift stage b, "1" in this case, is supplied to the ninth shift stage i via the serial input terminal Sin. Accordingly, the data in the shift register 24 changes to "100110101".

The outputs of the second to ninth shift stages b to i of the shift register 24 are applied via the eight ganged write switches 28 to the pattern memory 23, wherein they are written again at the address from which they were read out, that is, at the address 0 in this instance. That is, the left shift pulse $G_1$ output from the AND gate 38 is delayed $\tau_3$ by a delay circuit 49, from which it is applied to a write pulse $H_1$ to the pattern memory 23, and the 8-bit output "00110101" from the second to ninth shift stages b to i of the shift register 24 is written at address 0. This means that the data "10011010" stored at address 0 before the write has been rotated left one bit position in its entirety (see the field ① in FIG. 4).

Further, the four outputs of the first to fourth shift stages a to d of the shift register 24 are latched by the sample clock $D_1$ (FIG. 3) in the 4-bit latch 25 composed of four registers $R_1$ to $R_4$. In this instance, data "1001" is latched in the latch 25, from which it is supplied to the parallel-serial converter 26.

As described above, upon the generation of the first clock $B_1$ (FIG. 3) the left-hand 4-bit pattern "1001" of the 8-bit subpattern "10011010" stored at address 0 is provided to the parallel-serial converter 26 and at the same time the 8-bit subpattern is rotated left one bit position and re-stored at address 0 (see the field ① in FIG. 4).

On the other hand, the address counter 42 counts the sample clock $D_1$ (FIG. 3) and its count value goes to a "1" (row E). The subpattern "10101111" at address 1 is also read out similarly by a readout pulse $F_2$ and is rotated left by a shift pulse $G_2$, thereafter being re-written into address 1 by a write pulse $H_2$. The left-hand 4-bit pattern "1010" of the subpattern is latched in the latch 25 by a sample clock $D_2$ (see the field ② in FIG. 4). As the address counter 42 is incremented, the left-hand 4-bit patterns "1111" and "0001" of the 8-bit subpatterns stored at addresses 2 and 3 are also latched in the latch 25, from which they are supplied to the parallel-serial converter 26. The subpatterns stored at addresses 2 and 3 are also rotated left one bit position and re-written into the addresses, respectively. As a result of this, the four subpatterns in the pattern memory 23 each have been rotated left one bit position (see the field ④ in FIG. 4).

The parallel-serial converter 26 converts each of the sequentially supplied four parallel 4-bit patterns "1001", "1010", "1111" and "0001" into serial form, providing them as a serial data string "1001101011110001". In other words, the outputs of the left-hand first to fourth bits are selected from the outputs read out of addresses 0 to 3 on a cycle of four bits and are output in serial form, by which is generated the 16-bit pattern starting at the leftmost end of the subpattern "100110101" stored at address 0, that is, the pattern composed of the basic random pattern "100110101111000" and the "1" bit subsequent thereto.

One cycle ends with a fourth clock $D_4$ by which the subpattern stored at address 3 is read out, and the count value of the address counter returns to zero (row F in FIG. 3). In this state there are stored at the respective addresses of the pattern memory 23 8-bit subpatterns "00110101", "01011111", "11100011" and "00100110" rotated left one bit position and hence starting at 2nd, 6th, 10th and 14th bits of the basic random pattern, respectively (see the field 4 in FIG. 4).

In a similar manner, when the next four clocks B are produced one after another, the subpatterns are read out of the pattern memory 23 and each rotated left one bit position and the left-hand four bits of each pattern are latched in the latch 25, thereby generating a 16-bit pattern which starts at the leftmost end of the subpattern "00110101" stored at address 0, that is, a pattern "0011010111100010" which starts at the second bit of the basic random pattern. Thus a total of two basic random patterns and a pattern "10" have been generated in the previous and current 4-clock cycles.

Also in this instance, the subpatterns stored in the pattern memory 23 are further rotated left one bit position (see the fields ⑤, ⑥, ⑦ and ⑧ in FIG. 4), with the result that there is stored at address 0 a subpattern "01101010". Accordingly, in the next 4-clock cycle a 16-bit pattern "0110101111000100" which starts at the third bit of the basic random pattern "100110101111000" is created. In the 12-clock cycle so far, a total of three basic random patterns and a pattern "100" have been produced. The transition diagram of the pattern memory 23 in this case is shown in the field ⑫ in FIG. 4. In the next 4-clock cycle a 16-bit pattern "1101011110001001" is produced which starts at the fourth bit of the basic random pattern. Thus, four basic random patterns and a pattern "1001" have been created in this 4-clock cycle plus the previous three 4-clock cycles. The data stored in the pattern memory 23 at this time is as shown in the field ⑯ in FIG. 4.

The status of the data stored in the pattern memory 23 is the same as the status in which the left- and right-hand 4-bit strings of the data shown in the field ⓪, which is the initial state, are exchanged with each other. In the field ⑯ et seq., even if each 8-bit subpattern is rotated left one bit position while reading out the left-hand four bits one after another in the same manner as in the fields ⓪ to ⑮, the basic psedo random pattern cannot be correctly generated at and after a certain stage. The reason for this is that the fourth and fifth bits of each subpattern in the field ⑯ become discontinuous in the recurring basic random pattern owing to such an exchange of the left- and right-hand data as mentioned above. This discontinuity is indicated by the afore-mentioned vertical broken line in each field in FIG. 4. However, since the status of data in the field ⑯ is merely the result of an exchange of the left- and right-hand 4-bit strings in the field ⓪ as referred to above, the same results as those in the fields ⓪ to ⑮ could be obtained by reading out the right-hand four bits of each 8-bit subpattern and latching them in the latch 25 in the field ⑯ et seq. Accordingly, in the field ⑯ et seq. the pseudo random pattern can be created correctly in a cyclic order until the data of the left- and right-hand 4-bit strings is completely exchanged again by the sequential rotation shift (i.e. until the status of data in the field ⓪ is obtained). In this instance, however, since the right-hand 4-bit pattern "1001" of the subpattern at address 0 in the field ⑯ is the same as the pattern "1001" held in the latch 25 at that time, the right-hand four bits of the subpattern read out of the address 0 in the field ⑯ are not provided to the latch 25, but instead the subpattern is circularly shifted one bit position and the above-noted four bits are immediately re-written into address 0 of the pattern memory 23, and then the right-hand four bits of the subpattern at the next address are read out.

To implement the above-described operation, the device of the present invention has such an arrangement as follows:

In the present invention, the clock B is applied to the $2^n$ counter, that is, the $2^4$ counter 41, and when 16 clocks B have been counted, the select signal J which is the Q output of the flip-flop 43 is inverted by the rise of the most significant digit A4 of the $2^4$ counter 41. By this inversion the selectors 27 and 28 are switched to the input terminals $C_2$.

As a result of this, the outputs D4 to D7 of the fifth to eighth bits of the pattern memory 23 are provided to the second to fifth shift stages b to e of the shift register 24 via the first to fourth switches $S_1$ to $S_4$ of the selector 27, and the outputs D0 to D3 of the first to fourth bits are provided via the fifth to eighth switches $S_5$ to $S_8$ to the sixth to ninth shift stages f to i via the fifth to eighth switches $S_5$ to $S_8$ of the selector 27. Furthermore, the outputs of the sixth to ninth shift stages f to i are provided to the input terminals of the first to fourth bits of the pattern memory 23 via the first to fourth switches $S_1$ to $S_4$ of the selector 28, and the outputs of the second to fifth shift stages b to e are provided to the input terminals of the fifth to eighth bits of the pattern memory 23 via the fifth to eighth switches $S_5$ to $S_8$ of the selector 28. In a similar manner, when the $2^n$ counter 41 counts $2^n$ clocks B and the output of its most significant digit A4 falls, the select signal J is inverted and the outputs D0 to D3 and D4 to D7 of the pattern memory 23 are provided to the shift stages b to e and f to i of the shift register 24, respectively. That is to say, by the inversion of the select signal J upon each counting of $2^n$ (where n =4) input pulses by the $2^n$ counter 41, the selectors 27 and 28 are switched between the input contacts $C_1$ and $C_2$ alternately with each other; accordingly those left- and right-hand four bits of the subpattern read out of the pattern memory 23 which are to be provided to the latch 25 are selected alternately with each other.

Moreover, according to the present invention, the output I of the $2^n$ counter 41 is applied to the pulse generator 45. The pulse generator 45 responds to the fall of the output I of the $2^n$ counter 41 (row I in FIG. 3) to yield an adjust pulse K of a pulse width $\tau_4$ (row K). The adjust pulse K is applied via the OR gate 39 to the address counter 42, incrementing its count value by one (row E). The adjust pulse K is supplied to the pulse generator 46 as well and its output is applied as an adjust clock L via the OR gate 36, yielding a write pulse $F'_2$ (row F) and a left-shift pulse $G'_2$ (row G) of the shift register 24 and a re-write pulse $H'_2$ (row H) of the pattern memory 23. As a result, the respective control operations are performed corresponding to one clock, separately of the clock B.

That is, when the address value of the address counter 42 has gone to "0" (row E) by the counting of a 16th sample clock $D_{16}$ (row D), the pattern stored at address 0 is read out by the readout pulse $F'_1$ and shifted by the left-shift pulse $G'_1$, and the shifted data is re-written into address 0 by the write pulse $H'_1$.

On the other hand, the pulse width $\tau_4$ of the adjust pulse K from the pulse generator 45 is selected larger than the sum of the delays $\tau_1$, $\tau_2$ and $\tau_3$. Therefore, even after completion of the write by the write pulse $H'_1$ the address counter 42 is incremented, by the trailing edge of the adjust pulse K of the pulse width $\tau_4$, to "1" before the data of the second to fifth shift stages b to e of the shift register 24 is latched in the latch 25. Further, the pulse generator 46 is triggered by the trailing edge of the adjust pulse K to yield the adjust clock L. The adjust clock L is provided, as the readout pulse $F'_2$ for reading out the subpattern stored at address 1, the left-shift pulse $G'_2$ for shifting the read-out pattern to the left, and the write pulse $H'_2$, to the shift register 24 and the pattern memory 23 via the delay circuits 47, 48 and 49. As a result, the subpattern stored at address 1 is rotated left one bit position and at the same time its right-hand 4-bit pattern "1010" is latched by a sample clock $D'_2$ in the latch 25, from which it is supplied to the parallel-serial converter 26. Thus the readout, shift and re-write of the subpattern stored at address 0 are performed by a sequence of control pulses $F'_1$, $G'_1$ and $H'_1$ following the sample clock $D_{16}$ shown in row D of FIG. 3. In this instance, since a sample clock $D'_1$ indicated by the broken line does not exist, the pattern "1001" stored at address 0 is not latched in the latch 25 but instead the same pattern "1001" read out of address 3 in the previous cycle (the field ⑮ in FIG. 4) is held in the latch 25. The pattern held in the latch 25 is shown as (1001) in the field ①' in FIG. 4. This prevents the same pattern "1001" from being output from the latch 25 continuously for two clock cycles. Next, the right-hand four bits "1010" of the subpattern are read out of address 2 and latched in the latch 25, thereafter being provided to the parallel-serial converter 26. Following this, a sequence of basic random patterns are cyclically generated until the field ⑯' is reached. In the field ⑯' the adjust pulse K is produced again and the process returns to the field ①, after which the same operation as described above is repeated.

The above embodiment has been described with respect to the case where the 9-stage shift register 24 is employed, the data stored in the pattern memory 23 is read out therefrom and placed into the second to ninth shift stages b to i of the shift register 24, shifted left one stage and at the same time rotated left so that the output of the second shift stage b is provided to the ninth shift stage i and then the parallel outputs of the first to fourth shift stages a to d are latched in the latch 25. It is also possible, however, to employ an arrangement which uses an 8-stage shift register and in which the data of the pattern memory 23 is read out into the first to eighth shift stages of the shift register, the parallel outputs of the first to fourth shift stages are immediately latched and then the data is rotated left and re-written into the pattern memory 23.

Moreover, by using an ordinary 8-bit register in place of the 8-stage shift register 24 and selecting the method of connecting the data line from the register to the pattern memory 23, it is also possible to construct the device so that the read-out data is re-written into the memory as if it were re-written after being rotated left.

Figure 5:
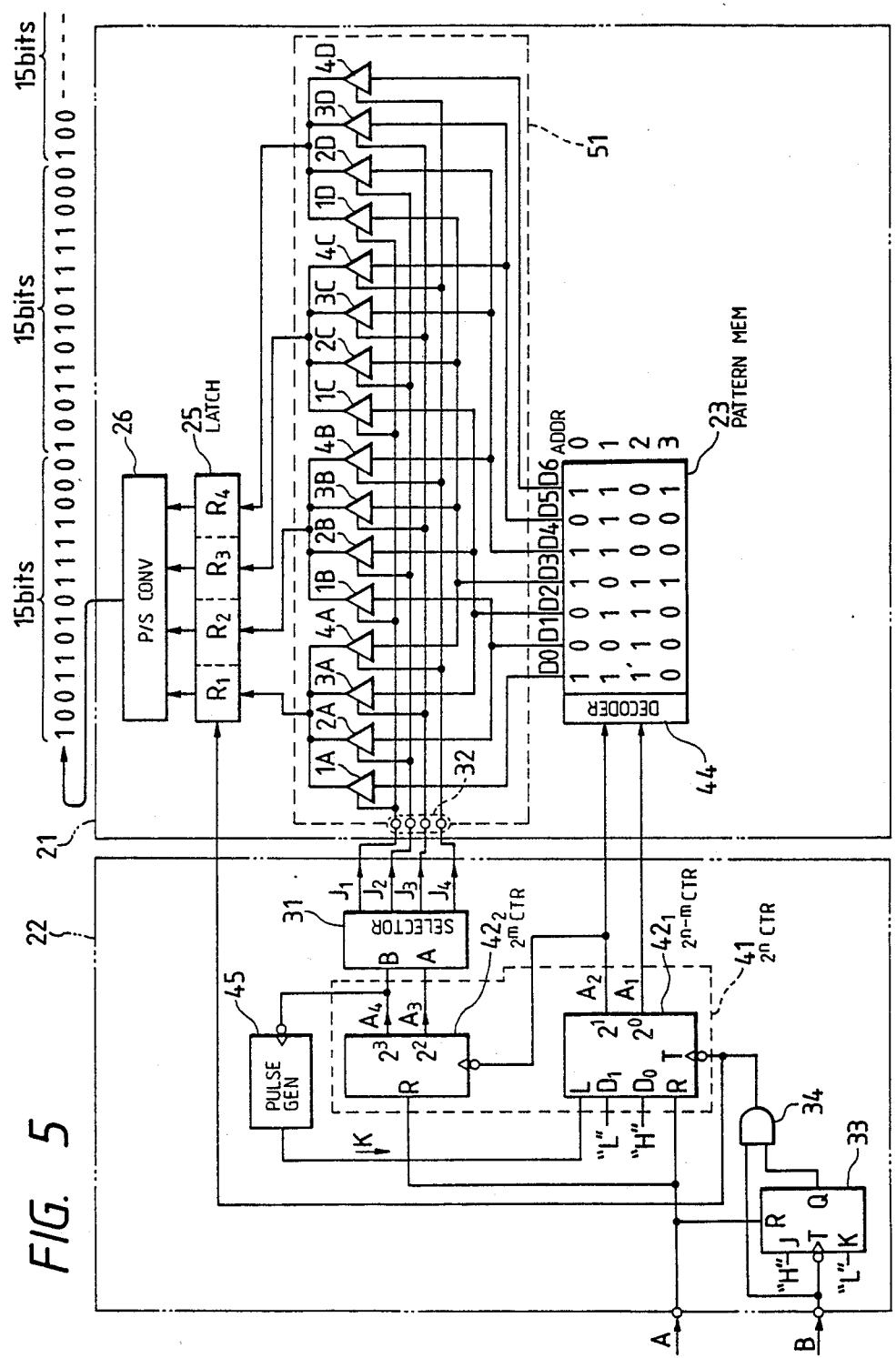
FIG. 5 is a circuit diagram illustrating another embodiment of the present invention.

FIG. 5 illustrates another embodiment of the present invention, in which n =4, m =2 and the basic random pattern is "1001101011111000" as in the embodiment shown in FIG. 2.

This embodiment employs, as the pattern memory 23, a $2^{n-m}$-word memory in which one word is $(2^{m+1}-1)$ bits long. In particular, a (7 bits ×4 words) pattern memory is used in this embodiment.

The data outputs D0 to D6 of seven bits of the pattern memory 23 are applied to a multiplexer 51, from which a 4-bit data output corresponding to select signals $J_1$ to $J_4$ which are selectively applied to select signal input terminal 32 is provided to the 4-bit latch circuit 25. The 4-bit pattern latched in the latch circuit 25 is provided to the parallel-serial converter 26, by which it is converted into serial data.

The select signal $J_1$ is applied to a control terminal of each of gates 1A, 1B, 1C and 1D, by which the outputs D0, D1, D2 and D3 of the first, second, third and fourth bits of the pattern memory 23 are applied to data input terminals of the above-mentioned gates. The select signal $J_2$ is provided to a control terminal of each of gates 2A, 2B, 2C and 2D, by which the outputs D1, D2, D3 and D4 of the second, third, fourth and fifth bits of the pattern memory 23 are supplied to data input terminals of these gates. The select signal $J_3$ is provided to a control terminal of each of gates 3A, 3B, 3C and 3D, by which the outputs D2, D3, D4 and D5 of the third, fourth, fifth and sixth bits of the pattern memory 23 are applied to data input terminals of these gates. The select signal $J_4$ is provided to a control terminal of each of gates 4A, 4B, 4C and 4D, by which the outputs D3, D4, D5 and D6 of the fourth, fifth, sixth and seventh bits of the pattern memory 23 are applied to data input terminals of these gates.

In other words, when the select signal $J_1$ is applied to the multiplexer 51, the data outputs D0 to D3 of the first to fourth bits of the pattern memory 23 are provided to the latch 25; when the select signal $J_2$ is applied to the multiplexer 51, the data outputs D1 to D4 of the second to fifth bits of the pattern memory 23 are provided to the latch 25; when the select signal $J_3$ is applied to the multiplexer 51, the data outputs D2 to D5 of the third to sixth bits of the pattern memory 23 are provided to the latch 25; and when the select signal $J_4$ is applied to the multiplexer 51, the data outputs D3 to D6 of the fourth to seventh bits of the pattern memory 23 are provided to the latch 25.

The controller 22 is supplied with the start signal A and the clock B, and control of respective parts is effected in synchronism with the clock B. The start signal A is applied to reset terminals R of the flip-flop 33, a $2^{n-m}$ counter $42_1$ and $2^m$ counter $42_2$, initializing them.

The maximum count value of the $2^{n-m}$ counter is equal to the number $2^{n-m}$ of patterns into which the basic random pattern is split at intervals of $2^m$ bits, and the maximum count value of the $2^m$ counter $42_2$ is equal to the bit length $2^m$ of each split pattern.

The output of the flip-flop 33 is provided to one input terminal of the AND gate 34, which is supplied at the other input terminal with the clock B. In synchronism with the fall of the clock B, the Q output of the flip-flop 33 becomes a high-level signal. When the AND gate 34 is enabled by this high-level signal, the clock B is applied therethrough to the latch 25 and the $2^{n-m}$ counter $42_1$. The latch 25 loads thereinto the output of the pattern memory 23 through the multiplexer 51 in synchronism with the rise of the clock B. The $2^{n-m}$ counter $42_1$ increments its count value in synchronism with the fall of the clock B applied to its clock terminal T and the count output is provided as an address signal to the address decoder 44 of the pattern memory 23. By the decoded output of the address decoder 44 the address of the pattern memory 23 to be read out is specified. Accordingly, a 4-bit pattern is latched by the leading edge of the clock B into the latch 25 from the pattern memory 23 and the address is incremented by the trailing edge of the clock B in preparation for the next latching operation.

A high-order digit output A2 of the $2^{n-m}$ counter $42_1$ is provided as a count pulse to the $2^m$ counter $42_2$, the count value of which is incremented by the fall of the pulse. The count outputs A3 and A4 of the $2^m$ counter $42_2$ are supplied to a selector 31, which supplies the select terminal 32 of the multiplexer 51 with that one of the select signals $J_1$ to $J_4$ which corresponds to the applied count value.

The high-order digit output A4 of the $2^m$ counter $42_2$ is supplied to the pulse generator 45, from which the adjust pulse K is provided to an initialization terminal L of the $2^{n-m}$ counter $42_1$. When the adjust pulse K is applied, the count value of the $2^{n-m}$ counter $42_1$ is set to a "1".

In this embodiment, as shown in the pattern memory 23 in FIG. 5, the basic random pattern "1001101011111000" is split at intervals of four bits into $2^{n-m}$ patterns and each split pattern is combined with a continuation pattern composed of three bits subsequent thereto in the recurrence of the basic random pattern, forming a 7-bit subpattern. The 7-bit subpatterns are stored in the pattern memory 23 whose word is 7-bits long.

When the start signal A goes low, the Q output of the flip-flop 33 goes high in synchronism with the clock B which is applied first thereafter, and the AND gate 34 is enabled, through which the clock B is supplied to the $2^{n-m}$ counter $42_1$ and the latch 25. The count value of the address counter $42_1$ is incremented in synchronism with the fall of the clock B and the incremented count value is applied as an address signal to the decoder 44 of the pattern memory 23. By this count value the addresses of the pattern memory 23 are specified cyclically in the order 0, 1, 2, 3, 0, 1, 2, 3, ...

At the start of operation the count value of the $2^m$ counter $42_2$ is "0", on the basis of which the selector 31 applies the select signal $J_1$ to the select terminal 32 of the multiplexer 51 By the select signal $J_1$ the data outputs D0 to D3 of the first to fourth bits of the subpattern stored in the pattern memory 23 at address 0 are selected and supplied to the latch 25, wherein they can be latched in synchronism with the clock B. As the read-out address of the pattern memory 23 advances step by step, the latch 25 latches therein the 4-bit patterns "1001", "1010", "1111" and "0001" of the subpatterns stored at addresses 0 to 3 and provides them to the parallel-serial converter 26. The parallel-serial converter 26 converts these four parallel 4-bit patterns in succession into a sequence of serial data "1001101011110001". That is, one basic random pattern "10011010111100" and one bit "1" subsequent thereto are thus generated.

After the operations corresponding to four clocks B the count value of the $2^m$ counter $42_2$ goes up to "1". When supplied with this count value "1", the selector 31 provides the select signal $J_2$ to the multiplexer 51. Based on the select signal $J_2$, the 4-bit patterns "0011", "0101", "1110" and "0010" of the second to fifth bits of the subpatterns stored at the respective addresses are read out of the pattern memory 23 by the next four clocks B from the $2^{n-m}$ counter $42_1$. The four 4-bit patterns thus read out of the pattern memory 23 are supplied to the parallel-serial converter 26, from which they are output as a sequence of serial data "0011010111100010". Thus two basic random patterns and a pattern "10" subsequent thereto have been generated in the previous and current 4-clock cycles.

Next, the count value of the $2^m$ counter $42_2$ is incremented to "2". The count value "2" is applied to the selector 31, from which the select signal $J_3$ is provided to the multiplexer 51. As a result of this, the outputs D2 to D5 of the third to sixth bits of the respective subpatterns stored in the pattern memory 23 are read out and loaded into the latch 25. The four read-out outputs are then provided to the parallel-serial converter 26, from which is output a pattern "0110101111000100". Thus three basic random patterns and a pattern "100" subsequent thereto have been generated so far.

Next, the count value of the $2^m$ counter $42_2$ is incremented to "3". Accordingly, the outputs of the fourth to seventh bits of the subpatterns stored in the pattern memory 23 at addresses 0 to 3 are sequentially read out and a 16-bit pattern "1101011110001001" is provided from the parallel-serial converter 26. Thus four basic random patterns and a pattern "1001" subsequent thereto have been generated so far.

At the end of the four cycles, i.e. at the end of 16th clock, the count value of the $2^m$ counter $42_2$ goes down to zero and the output A4 of its high-order digit falls, in synchronism with which the adjust pulse K is yielded from the pulse generator 45. By this adjust pulse K the initial value "1" is set in the $2^{n-m}$ counter $42_1$.

When the clock K is applied at this time, the first to fourth bit outputs of the subpattern "1010111" stored at address 1 are selected by the leading edge of the clock B and the pattern "1010" is latched. After this, the outputs of the first to fourth bits of the subpatterns stored at addresses 2 and 3 are similarly selected and latched. Accordingly, the patterns "1010", "1111" and "0001" are supplied to the parallel-serial converter 26, from which serial data "101011110001" is derived. That is, by combining the pattern "1001" generated in the previous cycle with the pattern "101011110001" in this cycle, the basic random pattern "100110101111000" and one bit "1" are obtained. Consequently, control for reading out a portion "1001" of the subpattern stored at address 0 is skipped over, making it possible to avoid an unnecessary repetition of the pattern readout operation.

Next, the count value of the $2^m$ counter $42_2$ is made "1", and the second to fifth bit outputs "0011", "0101", "1110" and "0010" of the subpatterns stored in the pattern memory 23 at the respective addresses thereof are sequentially read out, latched and applied to the parallel-serial converter 26, from which serial data "0011010111100010" is yielded. In a similar manner, the third to sixth bit outputs are sequentially read out of address 0, latched and supplied to the parallel-serial converter 26, from which serial data "0110101111000100" is derived. Following this, the fourth to seventh bit outputs are sequentially read out of addresses 0 to 3, generating serial data "1101011110001001". These serial data thus obtained are all contiguous to one another, providing a recurrence of the basic random pattern. At this time the adjust pulse K is yielded again; and so that "1" is set in the $2^{n-m}$ counter $42_1$. Thereafter the readout of the first to fourth bit outputs is performed starting at address 1 in a similar manner. Upon completion of the readout from address 3, the count value of the $2^{n-m}$ counter $42_1$ goes down to zero, which is followed by the readout of the second to fifth outputs from addresses 0 to 4.

As described above, in this embodiment the subpattern readout address is adjusted by the adjust pulse K which is produced by the pulse generator 45.

As described above, according to the present invention, the pattern memory for storing the basic random pattern is formed by a memory of a very small capacity and the control for generating the pseudo random pattern can be implemented by use of a simple high-speed readout control technique alone. Accordingly, the present invention is of particular utility when employed in the case where the high-speed generation of a pseudo random pattern is needed as in the field of digital communications.

It will be apparent that many modifications and variations may be effected without departing from the novel concepts of the present invention.

What is claimed is:

1. A pseudo random pattern generating device comprising:

pattern memory means wherein there are stored at $2^{n-m}$ addresses for $2^{n-m}$ subpatterns of at least $(2^{m+1}-1)$ bits in length, where n is an integer equal to or greater than 3 and m is a positive integer smaller than n, each of the subpatterns being composed of one of $2^{n-m}$ split patterns into which a pseudo random pattern, which recurs on a cycle of $(2^2-1)$ bits, is split at intervals of $2^m$ bits, starting at the beginning of the pseudo random pattern, and a continuation pattern of a predetermined number of bits subsequent to said each split pattern in the recurring pseudo random pattern;

a $2^{n-m}$ counter which counts a clock and sequentially outputs the count values as address signals;

readout means which is supplied with the address signals one after another, for reading out the subpatterns stored in said pattern memory means at addresses corresponding to the address signals, in synchronism with the clock;

shift means for outputting a pattern composed of a contiguous $2^2$ bits in each of the subpatterns read out by said readout means from the addresses, while circularly shifting in a rightward direction the $2^m$-bit pattern to be output by one bit position in the subpatterns upon each readout of the $2^{n-m}$ subpatterns;

latch means for latching the $2^m$-bit pattern output from said shift means; and parallel-serial converting means which is supplied with the $2^2$-bit pattern in parallel form from said latch means, for outputting the $2^m$-bit pattern as a serial pattern.

2. The device of claim 1, wherein the continuation pattern which is composed of a predetermined number of bits and is added to each of the $m$-bit split patterns, is a $2^m$-bit pattern, and each of the subpatterns is of $2^{m+1}$ bits and stored in said pattern memory means at one of respective addresses thereof as one word of $2^{m+1}$ bits in length.

3. The device of claim 2, wherein said pattern memory means is a read/write memory and said shift means includes shift register means to which each of the $2^{m+1}$-bit subpatterns read out of the respective addresses of said pattern memory means is applied in parallel and which circular-shifts, each of the subpatterns one bit position, and write means for writing the circular-shifted subpattern into said pattern memory means at the address from which the subpattern was read out.

4. The device of claim 3, wherein:

said shift register means includes $(2^{m+1}+1)$-stage shift register;

each of said $2^{m+1}$ subpatterns is applied in parallel to a second to $(2^{m+1}+1)$th stages of said shift register from said pattern memory means;

a pattern composed of $2^m$ bits from the first to $(2^m)$th stages of said shift register is provided in parallel to said latch means;

the output of the second stage of said shift register is connected to the input of the $(2^{m+1}+1)$th stage thereof; and said shift register responds to the clock to shift its contents toward said first stage thereof and, at the same time, circular-shifts the content of said second stage to said $(2^{m+1}+1)$th stage.

5. The device of claim 4, wherein said write means includes:
- a $2^n$ counter for counting the clock;
- adjust pulse generating means which upon each counting of $2^n$ clocks by said $2^n$ counter generates a shift adjust pulse and applies it as a shift signal to said shift register; and
- change over switch means which upon each counting of $2^n$ clocks by said $2^n$ counter exchanges the bit positions of first to $2^m$th bits and $(2^m+1)$th to $(2^{m+1})$th bits of each of the subpatterns read out of said pattern memory means and then provides them to said shift register.

6. The device of claim 2, wherein the continuation pattern of a predetermined number of bits, added to each $2^m$-bit subpattern, is a $(2^{m+1}-1)$-bit pattern and the subpattern stored at each address of said pattern memory means is stored as a word of $(2^{m+1}-1)$ bits in length.

7. The device of claim 6, wherein the shift means includes:
- multiplexer means which is supplied with a $(2^{m+1}-1)$-bit output from said pattern memory means for selectively supplying said latch means with desired contiguous $2^m$ bits of said applied $(2^{m+1}-1)$ bits; and
- shift control means for circularly shifting the contiguous $2^m$ bits selected by said multiplexer means by one bit position in the subpatterns in a right direction upon each counting of $2^{n-m}$ clocks.

8. The device of claim 7, wherein said shift control means includes address adjust means for setting said $2^{n-m}$ counter to a predetermined value upon each counting of $2^n$ clocks.

9. A pseudo random pattern generating device comprising:
- a memory for storing, as one word, $2^{n-m}$ subpatterns of $2^{m+1}$ bits in length, where n is an integer equal to or greater than 3 and m is a positive integer smaller than n, each of the subpatterns being composed of one of a plurality of split patterns into which a pseudo random pattern, which recurs on a cycle of $(2^n-1)$ bits, is split at intervals of $2^m$ bits and a continuation pattern of $2^m$ bits subsequent to said each split pattern;
- an address counter, coupled to said memory, for counting clocks up to $2^{n-m}$, respectively and providing the count value as an address signal to said memory;
- a shift register, coupled to said memory, for inputting thereinto in parallel a pattern read out of said memory for each clock;
- means for circularly shifting the pattern input into said shift register by one bit position in a leftward direction to produce a shifted pattern;
- means for writing the shifted pattern into said memory;
- a latch, coupled to said shift register, for latching a pattern composed of $2^m$ bits at the leftmost $2^m$ bit positions of the pattern in said shift register by the clock after the shifted pattern has been written into said memory;
- a parallel-serial converter, coupled to said latch, for converting the latched pattern into a serial pattern;
- a $2^n$ counter for counting clocks up to $2^n$;
- means for switching over the leftmost $2^m$ bits and the rightmost $2^m$ bits of each output pattern from said memory in response to an overflow of said $2^n$ counter; and
- means responsive to the output of said $2^n$ counter for additionally incrementing said address counter by one, for additionally inputting in parallel an additionally read-out pattern from said memory into said shift register, for additionally shifting said parallel-input pattern one bit position, and for additionally causing said write means to write said shifted pattern.

10. A pseudo random pattern generating device comprising:
- a memory which stores therein $2^{n-m}$ subpatterns each of $(2^{m+1}-1)$ bits in length, where n is an integer equal to or greater than 3 and m is a positive integer smaller than n, each of the subpatterns being composed of one of a plurality of split patterns into which a pseudo random pattern, which recurs on a cycle of $(2^n-1)$ bits, is split at intervals of $2^m$ bits and a continuation pattern of $(2^m-1)$ bits subsequent to said each split pattern;
- a $2^{n-m}$ counter, coupled to said memory, for counting a clock and providing the count value as an address signal to said memory;
- a $2^m$ counter, coupled to said $2^{n-m}$ counter, for counting a carry of said $2^{n-m}$ counter;
- a multiplexer having inputs connected to parallel $(2^{m+1}-1)$-bit outputs of said memory, and having control terminals coupled to said $2^m$ counter for receiving therefrom the count value as a control input, and which produces as an output, in accordance with the control input, one of $2^m$ combinations of patterns of sequentially contiguous $2^m$ bits in a $(2^{m+1}-1)$-bit pattern read out of said memory using the address signal supplied from said $2^{n-m}$ counter;
- a latch, coupled to said multiplexer, into which the output of said multiplexer is input upon each generation of said clock;
- a parallel-serial converter, coupled to said latch, for converting the output of said latch into a serial pattern; and
- means for incrementing said $2^{n-m}$ counter by one upon each generation of an output of said $2^m$ counter.

* * * * *

UNITED STATES PATENT AND TRADEMARK OFFICE
CERTIFICATE OF CORRECTION

PATENT NO. : 4,901,264
DATED : FEBRUARY 13, 1990
INVENTOR(S) : MISHIO HAYASHI

It is certified that error appears in the above-identified patent and that said Letters Patent is hereby corrected as shown below:

Col. 5, line 15, "pulse B" should be --pulse G--;
line 54, "2'," should be --②'--.

Col. 12, line 30, "51 By" should be --51. By--.

Col. 14, line 14, "$(2^2-1)$" should be --$(2^n-1)$--;

line 27, "$2^2$" should be --$2^m$--;

line 36, "$2^2$-bit" should be --$2^m$-bit--;

line 41, "$^m$-bit" should be --$2^m$-bit--.

Col. 15, line 10, "change over" should be --changeover--;
line 50, "respectively" should be --repeatedly--.

Signed and Sealed this

Twenty-sixth Day of March, 1991

Attest:

HARRY F. MANBECK, JR.

*Attesting Officer*     *Commissioner of Patents and Trademarks*